US005538817A

United States Patent [19]
Smith et al.

[11] Patent Number: 5,538,817
[45] Date of Patent: Jul. 23, 1996

[54] GRAY LEVEL IMAGING MASKS AND METHODS FOR ENCODING SAME

[75] Inventors: Adlai H. Smith, San Diego; Robert O. Hunter, Jr., Rancho Santa Fe; Bruce B. McArthur, San Diego, all of Calif.

[73] Assignee: Litel Instruments, San Diego, Calif.

[21] Appl. No.: 261,488

[22] Filed: Jun. 17, 1994

[51] Int. Cl.$^6$ ........................................ G03F 9/00
[52] U.S. Cl. ................... 430/5; 430/321; 430/322; 430/323; 216/41 W
[58] Field of Search ................... 430/5, 321, 322, 430/323; 156/643

[56] References Cited

U.S. PATENT DOCUMENTS

| | | | |
|---|---|---|---|
| 5,254,202 | 10/1993 | Kaplan | 430/5 |
| 5,286,584 | 2/1994 | Fenmink et al. | 430/5 |
| 5,328,785 | 7/1994 | Smith et al. | 430/5 |

Primary Examiner—S. Rosasco
Attorney, Agent, or Firm—Townsend and Townsend and Crew

[57] ABSTRACT

Transparent and wholly transmissive optical plates are disclosed in which features to be ablated are formed to produce varying levels of transmission of an ablating laser beam, preferably scanned across the plate. Use of the plate for ablation extends to forming openings of varying depths with timed ablating exposures of known intensity. Alternately, the ablation profile of a single image can be controlled utilizing a timed exposure of known intensity to provide an ablated opening of a specific designed profile in a workpiece. Three specific plate image constructions are illustrated. These include gratings which taper in width (continuous and step tapers both being disclosed), randomly placed diffracting elements which taper in density, and gratings having interrupted portions which taper in density. Where the intensity across a feature is uniform, ablation to controlled depths may occur. Where the intensity across a feature is non-uniform and varies, ablation of apertures having variable controlled profiles may occur. Plates of this construction have utility with techniques for producing apertures with designed profile.

17 Claims, 5 Drawing Sheets

GRAY LEVEL IMAGING MASKS AND METHODS FOR ENCODING SAME

This invention relates to a mask and a process utilizing a mask for the laser ablation of openings in workpieces. Specifically, a mask is disclosed which contains an image of the opening to be ablated, this image having optical features with a density—tapered or constant—which when exposed to laser energy of known fluence and timed duration can result ablation with measured contours.

BACKGROUND OF THE INVENTION

Brannon et al. U.S. Pat. No. 4,508,749 issued Apr. 2, 1985 illustrates that ablation of openings in polyimide can be done using imaging systems in combination with excimer lasers. FIGS. 1 and 2 of this patent illustrate apparatus for accomplishing this purpose. The mask used for ablation in Brannon et al. is typically a reflective dielectric mask. A dielectric mask is required since the usual hard chrome masks quickly erode when exposed to the fluence levels required for polyimide ablation.

More resilient and better suited for the purposes of ablation are the wholly transparent masks of our patent applications Hunter et al. U.S. patent application Ser. No. 08/058,906 filed May 6, 1993, entitled Apparatus and Process for the Production of Fine Line Metal Traces (now U.S. Pat. No. 5,364,493, issued Nov. 15, 1994); Smith et al. U.S. patent application Ser. No. 08/230,183 filed Apr. 20, 1994 entitled High Power Phase Masks for Imaging Systems (now U.S. Pat. No. 5,482,801 issued Apr. 20, 1994); and Smith et al. U.S. patent application Ser. No. 07/833,939 filed Feb. 10, 1992 entitled High Power Phase Mask for Imaging Systems (now U.S. Pat. 5,328,785 issued Jul. 12, 1994).

In certain applications, notably ink jet nozzle production, it is desirable to control the exact fluence profile on the workpiece in order to achieve specific wall slopes and shapes. This much is set forth in Smith et al. U.S. patent application Ser. No. 08/215,851 filed Mar. 21, 1994 entitled Apparatus and Process for Optically Ablated Openings Having Designed Profile. This reference requires that the profile of ablation over the area of an opening in a workpiece be carefully controlled.

Existing techniques for varying the intensity level over a mask are rather crude and limited in their scope of applicability. Most commonly, a multiple step process is used to manufacture a dielectric mask with a discrete number of transmission or gray levels. See Burns et al. U.S. Pat. No. 4,684,436 issued Aug. 4, 1987 and entitled Method of Simultaneously Etching Personality and Select. Alternately, it is known to shape holes utilizing a wobbling optical reflecting surface which imparts to an ablating beam a profile which can be reproduced. Others have noted that certain beams produce holes of certain shapes—and where the shape is desirable, the beam structure is used. It is to be noted that such techniques do not lend themselves to the design of the specific profile of an aperture to be produced. That is to say, determining first the specific profile that it is desired to achieve and thereafter designing a beam and mask combination which will ablate that desired profile—both in overall shape and desired depth.

RELATED PATENT APPLICATION

In Hunter et al. U.S. patent application Ser. No. 08/177,356 filed Jan. 3, 1994 entitled Use of Fresnel Zone Plates for Materials Processing, a technique referred to as "chirping" is referred, especially with reference to FIGS. 25 and 26. These features superficially resemble those features produced herein. A distinction exists between these two techniques.

In that above reference application, holographic plates which both form an image and focus the light for an image are disclosed. The chirping technique disclosed in Use of Fresnel Zone Plates for Materials Processing is utilized to get around the minimum optical feature size on such a holographic plate. This technique when used enables larger—and hence fabricatable features to be utilized and produce the required holographic image.

Here we disclose plates whose purpose is to form in an otherwise ablating beam an image. The image is not a holographic image. The image here is relayed through an imaging objective that projects the mask object onto the workpiece. The image produced for ablation is either one having a tapered intensity profile or alternately an image having a controlled intensity level.

SUMMARY OF THE INVENTION

Transparent and wholly transmissive optical plates are disclosed in which features to be ablated are formed to produce varying levels of transmission of an ablating laser beam, preferably scanned across the plate. Use of the plate for ablation extends to forming openings of varying depths with timed ablating exposures of known intensity. Alternately, the ablation profile of a single image can be controlled utilizing a timed exposure of known intensity to provide an ablated opening of a specific designed profile in a workpiece. Three specific plate image constructions are illustrated. These include gratings which taper in width (continuous and step tapers both being disclosed), randomly placed diffracting elements which taper in density, and gratings having interrupted portions which taper in density. Where the intensity across a feature is uniform, ablation to controlled depths may occur. Where the intensity across a feature is non-uniform and varies, ablation of apertures having variable controlled profiles may occur. Plates of this construction have utility with techniques for producing apertures with designed profile.

BRIEF DESCRIPTION OF THE DRAWINGS

FIGS. 2A–2E are respective views with,

FIG. 2A illustrating in profile the cross section of a channel desired to be ablated, FIG. 2B illustrating the intensity profile required with respect to the channel for the desired ablation, FIG. 2C illustrates a first grating configuration for ablation of the channel including gratings having tapered widths in order to obtain the ablation profile of FIG. 2B and the channel of FIG. 2A, FIG. 2D illustrates a second grating configuration for ablation of the channel including randomly placed pi-phase shifting elements having variable density in order to obtain the intensity profile of FIG. 2B and the channel of FIG. 2A, FIG. 2E illustrates a third grating configuration for ablation of the channel including tapered and randomly placed deflecting elements having variable density in order to obtain the intensity profile of FIG. 2B and the channel of FIG. 2A;

DESCRIPTION OF THE PREFERRED EMBODIMENT

Figure 1:
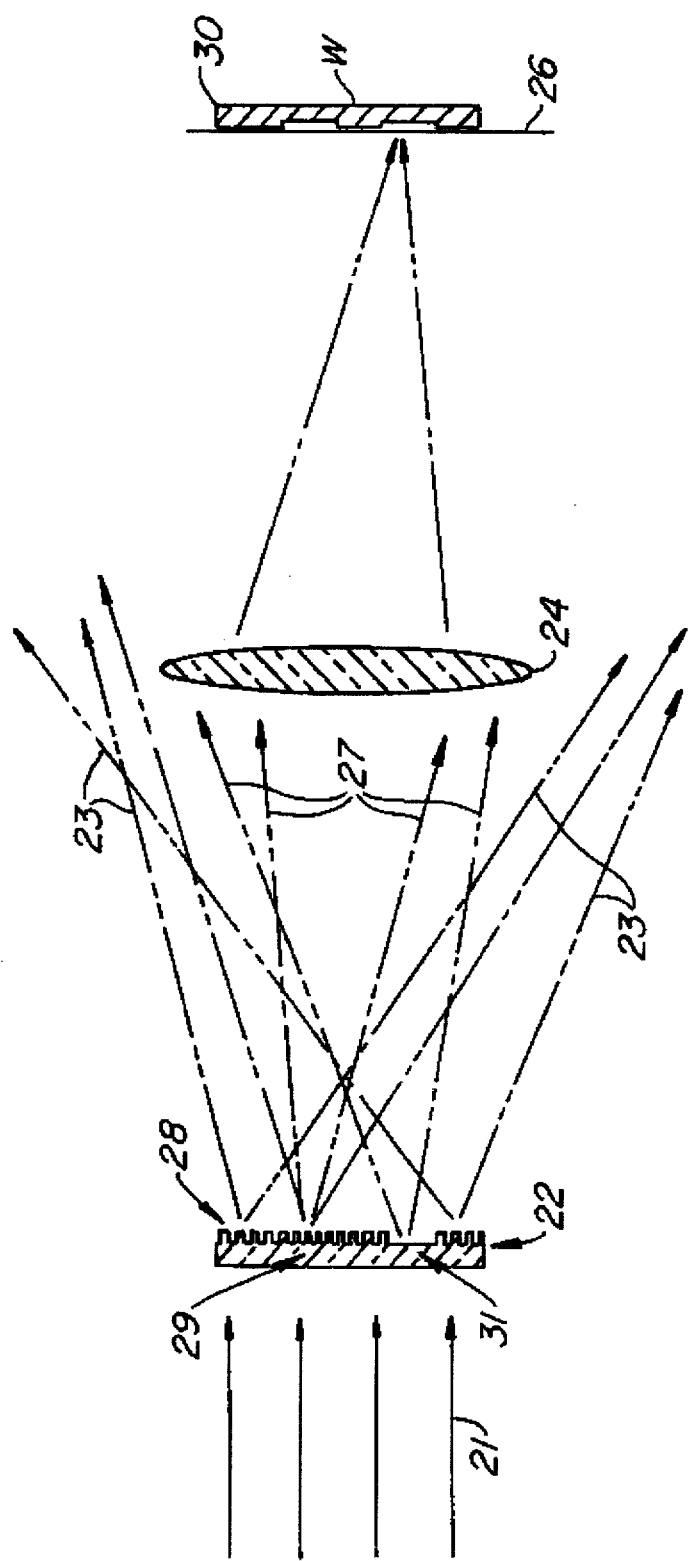
FIG. 1 is an optical schematic illustrating a mask being utilized in combination with a laser beam of known intensity and duration to effect ablation through a mask and imaging objective for ablating a workpiece, this schematic being inclusive of the prior art.

FIG. 1 schematically illustrates ablation taking place using a projection imaging system.

Light 21 is incident on transparent mask 22. Transparent mask 22 scatters light within first angularity 27 which falls within collection aperture or numerical aperture of imaging objective 24 and second angularity 23 which is outside the collecting or numerical aperture of imaging objective 24.

Incident light 21 is preferably laser light but can be any relatively monochromatic source such as a spectrally filtered Xenon flashlamp.

Imaging objective 24 is schematically represented by a single lens. In general it is any refractive, reflective, catadioptric or other optical projection system capable of relaying light from the plane of mask 22 to workpiece plane 26. The light collected by the entrance pupil of imaging objective 24 then creates either a magnified or demagnified image with greater or lesser intensity than is incident on mask 22 in plane 26. Light so incident on workpiece 30 is then used to ablate or otherwise remove material from the workpiece W.

Incident light 21 is here drawn as being parallel, this being a suitable representation for chief rays of an imaging objective which is telecentric on the object side. In fact, the incident light field will generally contain many different incident angles at a given point on mask 22 resulting from prior intensity homogenization optics. More generally, the incident light field will have a gross curvature consistent with mapping the chief ray of the incident light field onto the center of the imaging objective's entrance pupil.

Closer examination of FIG. 1 reveals three types of regions on mask 22. The first ablation region 31 consists of open areas containing no pi-phase shifting regions. Light 21 incident on it is mainly scattered into the collecting aperture of imagining objective 24 and thereafter imaged onto workpiece 30. Second partial ablation region 28 consists of regions where 50% of the area is covered by pi-phase shifting areas. These pi-phase shifters can consist of regular gratings or random pixellated patterns. The effect of regular, 50% duty cycle gratings of the appropriate depth is to scatter incident light 21 at integer multiples of the angle lambda/GP.

Lambda is the wavelength of incident light 21 while GP is the grating or groove period on the mask.

The grating period GP is chosen small enough that coherent light at these angles falls outside the entrance pupil of imaging objective 24. Rays of second angularity 23 of FIG. 1 represent light so scattered.

The other possibility for region 28 is that it consists of randomly placed, pi-phase shifting pixels that cover 50% of the area on average. In this case, incident light is spread into a cone of angle~lambda/d, where lambda is the wavelength of the incident light and d is the pixel size. By choosing the pixel size d small enough, the fraction f~$(NA/(lambda/d))^2$ of incident light projected by imaging objective 24 onto workpiece 30 (NA is the numerical aperture of the imaging objective on the objective side) can be reduced to below the fluence necessary for obtaining a working effect on the workpiece.

A mask containing features of the type exemplified by regions 28 and 31 must cooperate with the imaging objective. Such masks have been described in Smith et al. U.S. patent application Ser. No. 07/833,939 filed Feb. 10, 1992 entitled High Power Phase Mask for Imaging Systems (now U.S. Pat. No. 5,328,785 issued Jul. 12, 1994). The grating type mask there illustrated produces an intensity profile (neglecting diffraction by the imaging objective) on the workpiece with a sharp edged hole.

Tapered intensity regions 29 on mask 22 are structures that produce a fluence intermediate to 0 and $I_{inc}$ (assuming for simplicity of discussion the imaging objective scales the incident intensity by 1) and can do so in a continuous manner. Masks containing such structures are therefore appropriately called gray level masks. The action of these regions on incident light 21 is to scatter some of it (rays 27) into the entrance pupil of the imaging objective and the rest (rays 23) outside the entrance pupil. The ability to modulate or regulate the amount of light scattered into the entrance pupil allows for the generation of varied fluence or intensity levels in the projected image pattern. Intensity levels respectively below and above the threshold intensity for ablation on the workpiece. Intensity level $I_{inc}$ is incident on mask 22 and in clear regions 31 is scaled up or down.

Figure 2A:
Figure 2B:
Figure 4A:
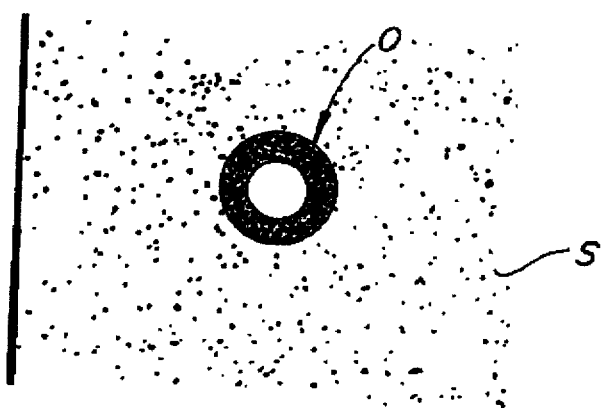
FIG. 4A and 4B are respective plan and side elevation section of an opening in a workpiece formed by the mask illustrated in FIG. 3 in the apparatus of FIG. 1.
Figure 4B:

FIG. 2B illustrates an intensity profile $I_{inc}$ obtained with a continuous gray level mask. FIG. 4a is an opening ablated with a controlled wall contour, the slope being controlled by the rate at which the fluence profile of FIG. 4b falls off from its peak value. The parameters for this controlled intensity profile can be obtained from our co-pending Smith et al. U.S. patent application Ser. No. 08/215,851 filed Mar. 21, 1994 entitled Apparatus and Process for Optically Ablated Openings Having Designed Profile. This disclosure is incorporated herein by reference.

This disclosure sets forth three (3) different techniques for obtaining this gray level intensity modulation. These respective techniques are illustrated by FIG. 2C, 2D and 2E.

Figure 2C:
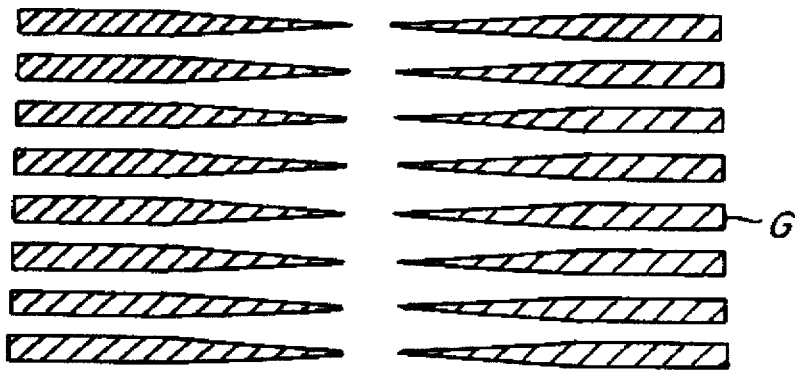
Figure 2D:
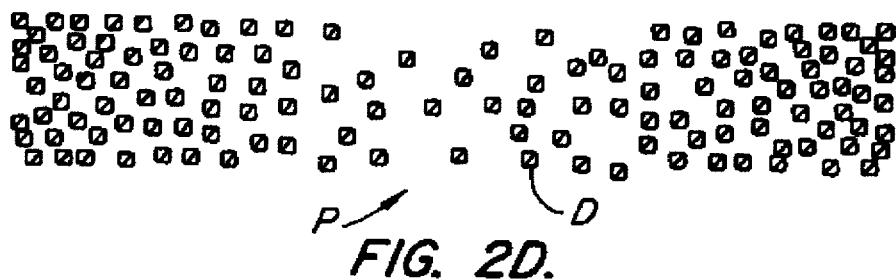
Figure 2E:
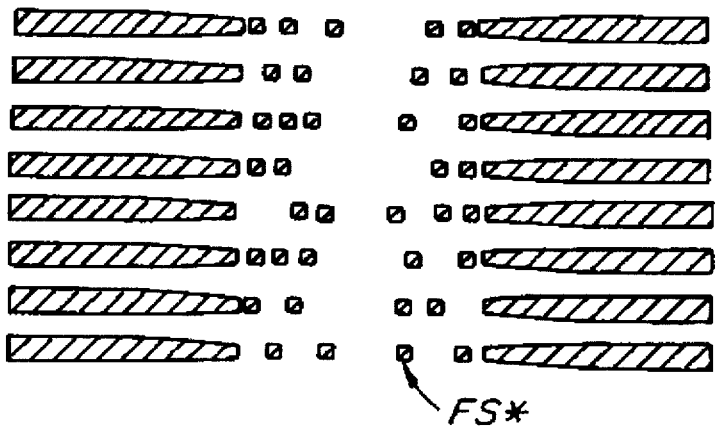

Referring to FIG. 2C, the first technique varies the groove width of a periodic grating, making the width of the grooves smaller as the projected amplitude increases. The groove depth is chosen so to produce a pi phase shift on the incident light. Mathematically, if A(x,y) is the desired amplitude (= square root of the transmission so it varies from 0 to 1) at point x,y in the mask plane, then the groove width w is varied according to the formula:

$$w = GP*(1-A(x,y))/2 \quad (1)$$

Where GP is the grating or groove period.

FIG. 2C illustrates the groove pattern required for an intensity profile such as FIG. 2B.

Figure 3:
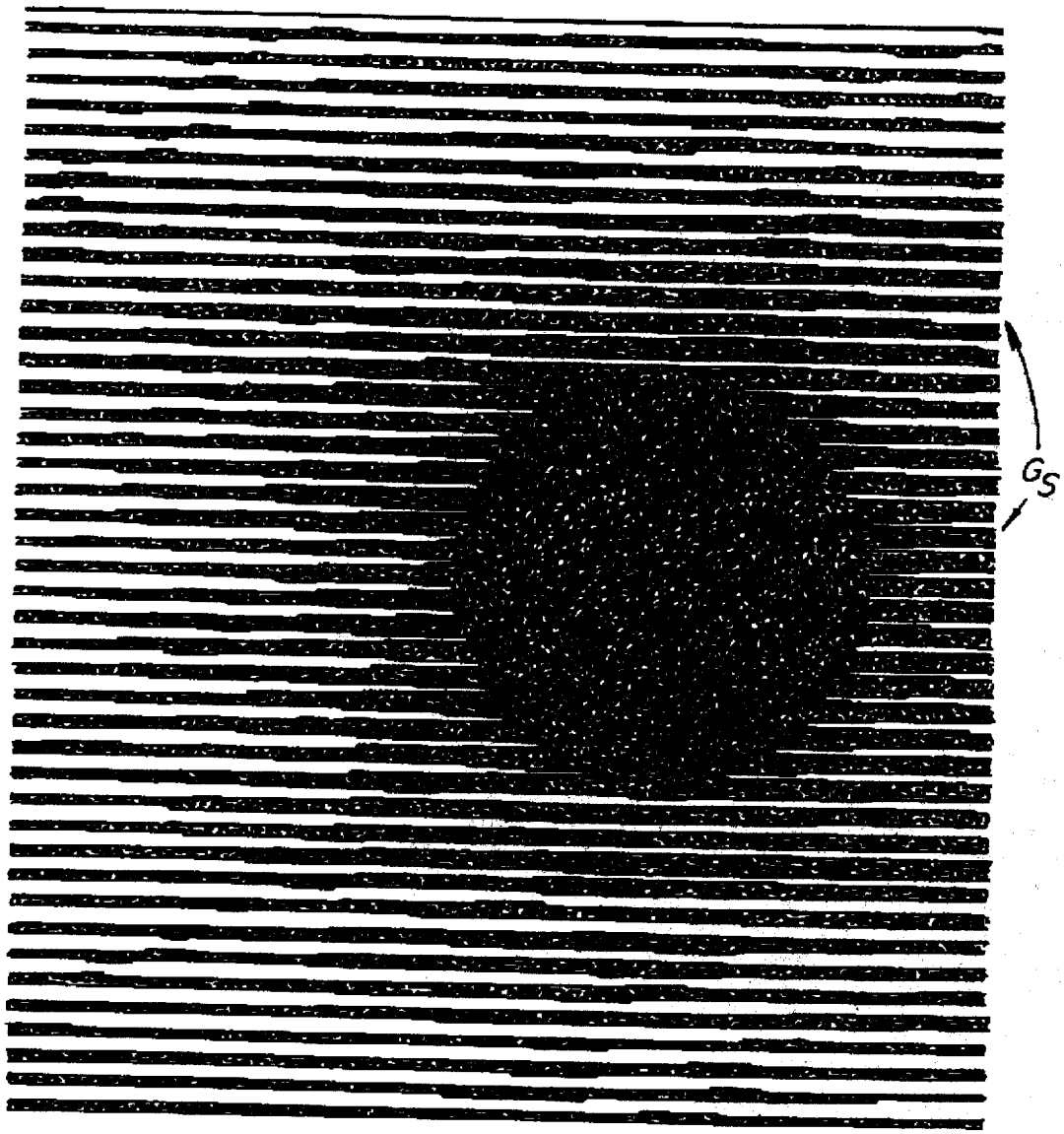
FIG. 3 is a diagram of a portion of a mask for producing an opening in a workpiece having a total 50 micron diameter with an ultimate opening fabricated in the order of 25 microns utilizing tapered feature widths for the production of the image.

It will be apparent that FIG. 2C illustrates gradually tapering gratings G. As illustrated in FIG. 3, step taper gratings $G_s$ may be used as well.

FIG. 3 is a plot of a circularly symmetric profile made in accordance with equation (1). Further, while gratings illustrated in FIG. 2C will ablate a channel, it will be understood FIG. 3 produces a circular opening with tapered intensity at its edges. When a mask having a portion of its imaging surface configured with the profile of FIG. 3 is used in conjunction with a laser having known fluence and time exposure time, opening O in substrate S results (see FIGS. 4A and 4B).

Referring to FIG. 2D, the second technique utilizes an array of randomly placed pixels P of size D, the probability or local frequency of occurrence of a pixel determining the local amplitude transmission of the mask. Each pixel constitutes a depression in the glass surface to a depth so as to produce a pi-phase shift of the incident light. The pixels can be centered on a regular grid, but are preferably irregularly spaced. The local areal density of pixels is P where $$P = (1 - A(x,y))/2 \qquad (2)$$

P also represents the probability that a pixel on a regular grid is chosen for etching. After choosing which pixels on a regular array are to be etched, they can then be slightly rearranged to have an irregular spacing. This is illustrated by FIG. 2D.

The third method combines elements of the above two and is the preferred approach for encoding gray level masks. Having determined a grating period (GP) appropriate for the mask, the smallest readily manufacturable feature size FS* is determined. FS* will vary according to the methods chosen or available for the mask manufacture. In any event, FS* < GP/2, otherwise the chosen grating period is itself not manufacturable. The width w of the groove is then calculated according to equation 1 and when w is greater or equal to the minimum manufacturable feature size FS*, continuous narrowed groove gratings are made, but should it be less than FS* the otherwise continuous groove is interrupted with a probability P determined by GP, FS* and the desired local amplitude A(x,y). Stated as an algorithm for determining the mask pattern:

1) Compute the continuous groove width w from $$w = GP*(1 - A(x,y))/2 \qquad (3)$$

2) If w>or=FS*, fabricate a continuous groove.
3) If w< FS*, etch a FS* X FS* square with probability P determined from $$P = GP*(1 - A(x,y))/(2*FS*) \qquad (3).$$

The results of this 3 step procedure is illustrated by FIG. 2E.

Figure 5:
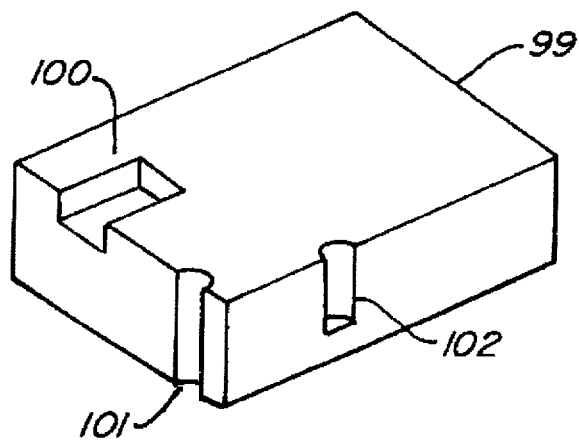
FIG. 5 is a perspective view of a workpiece taken from FIG. 6 of Burns U.S. Pat. No. 4,684,436, this workpiece being ablated by the mask described herein.

Referring to FIG. 5, it may be desirable to machine openings to different depths. FIG. 8 shows a workpiece 99 with shallow opening 100, intermediate depth opening 102 and through opening 101. The mask patterns for creating these openings by methods and techniques set forth with respect to FIGS. 2C, 2D and 2E is shown respectively in FIGS. 6, 7, and 8.

Figure 6:
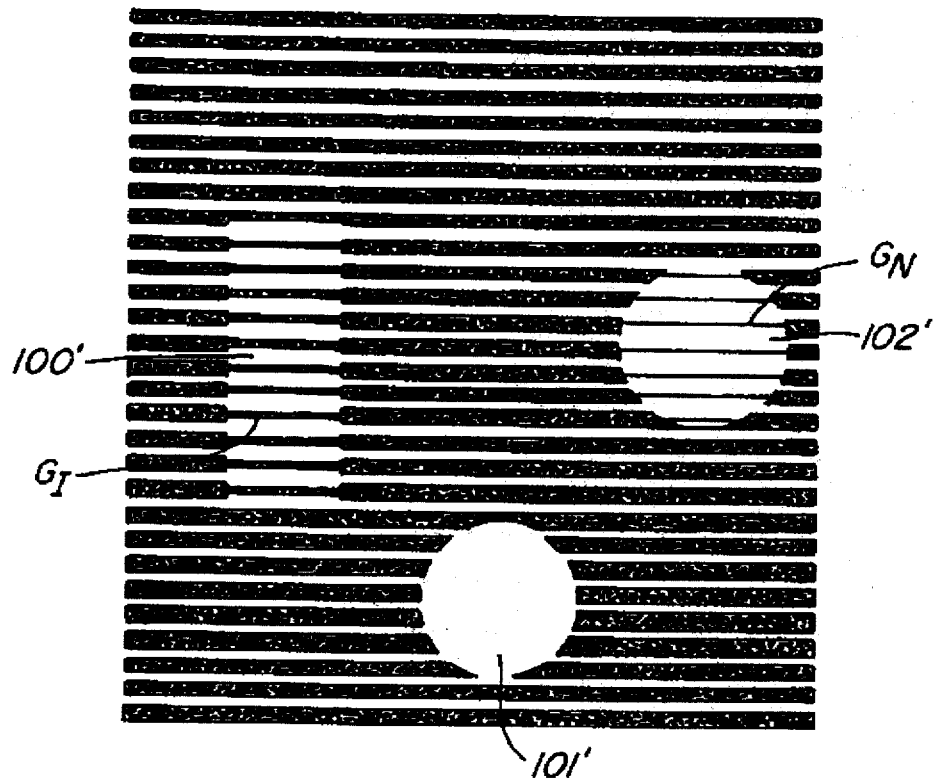
FIG. 6 is a first mask for effecting the ablation of FIG. 5 using tapered gratings.

FIG. 6 shows a narrowed groove mask for making differential intensity levels. Thus through hole 101 is made with the area 101' which exposes workpiece 99 to the maximum fluence. Shallow opening 100 is created by area 100' having intermediate narrowed gratings $G_I$ which scatters the most light of the three mask features and therefore projects the lowest fluence on workpiece 99. Intermediate depth opening 102 is formed by area 102' having fine narrowed gratings $G_N$.

Figure 7:
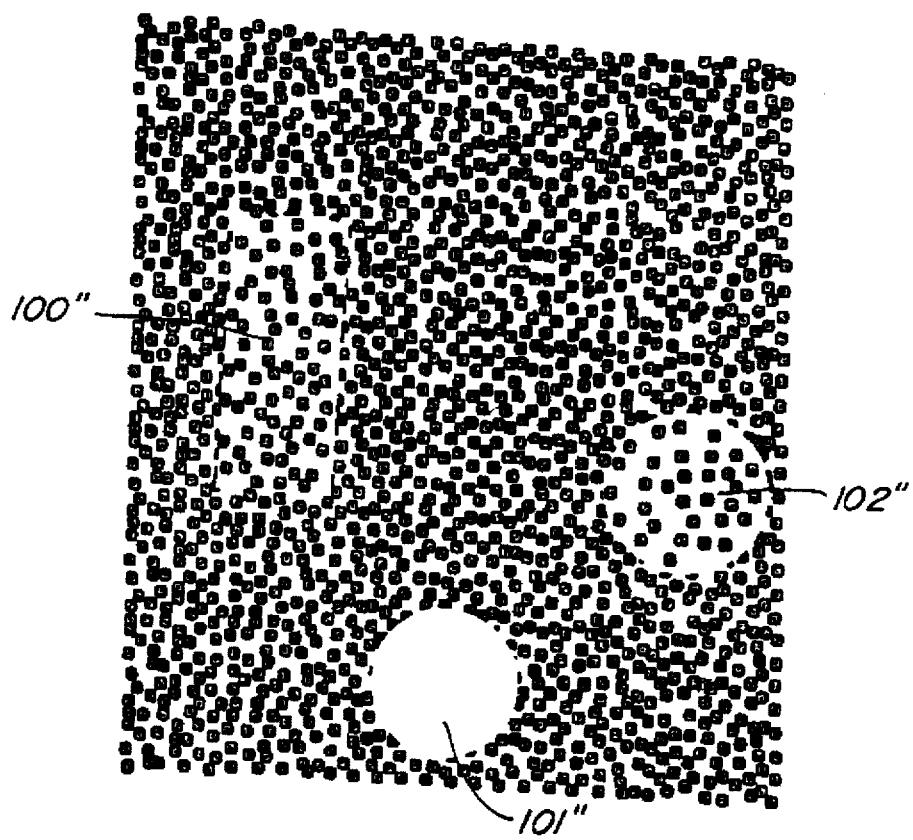
FIG. 7 is a second mask for effecting the ablation of FIG. 5 using randomly placed pi-phase shifting elements; and, FIG. 8 is a third mask for effecting the ablation of FIG. 5 utilizing randomly interrupted grating elements.
Figure 8:
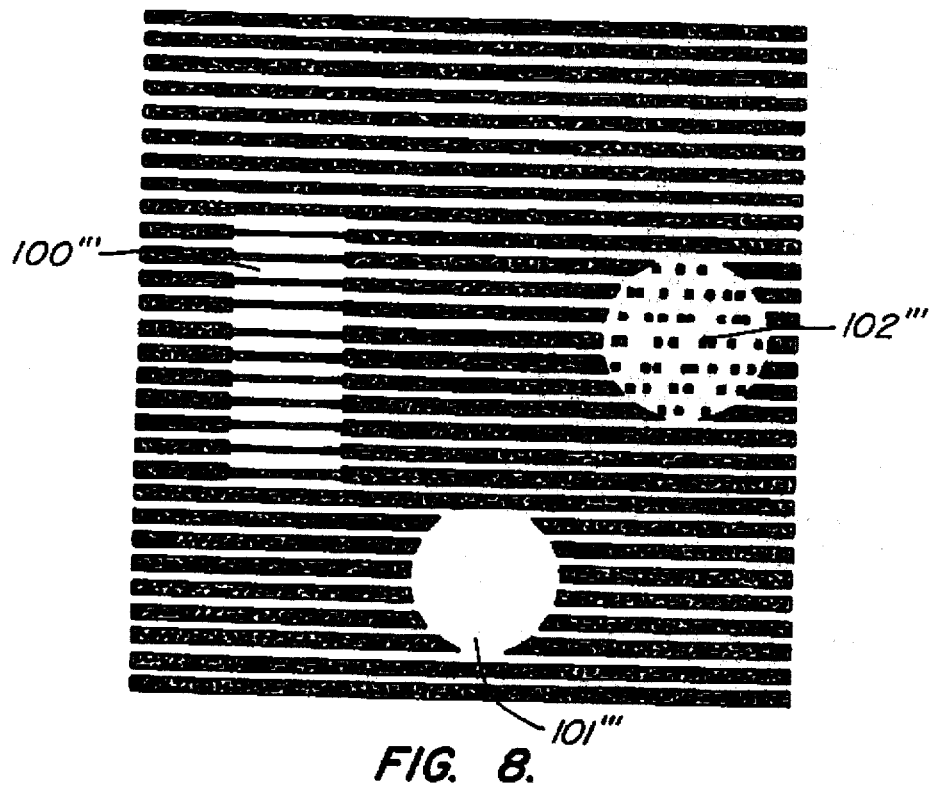

FIG. 7 shows the mask pattern as determined by the second method of FIG. 2D to create the structures of FIG. 5.

Again, the area with the least density of π-phase shifting regions, 101" projects the largest fluence while the area with greatest density of π-phase shifting regions 100", projects the least fluence.

FIG. 8 shows the mask pattern as determined by the third method to create the structures of FIG. 5. Again, the area with the least density of π-phase shifting regions, 101''', projects the largest fluence while the area with greatest density of π-phase shifting regions, 100''', projects the least fluence.

The invention has been described in terms of a preferred embodiment. The invention, however, is not limited to the embodiment depicted and described. Rather, the scope of the invention is defined by the appended claims.

What is claimed is:

1. A mask for ablation of a workpiece by coherent light, the mask having a region for projection of a working image through an imaging objective at a workpiece, the working image having fluence sufficient to produce ablation of an opening corresponding to the region at the workpiece, the mask comprising:

a substrate transparent to the coherent light;

transparent optical features only on the mask for amplitude variation of the coherent light passing through the mask adjacent the transparent optical features for deflecting light into and out of the imaging objective;

the transparent optical features arrayed on the mask to form regions complimentary in shape to a corresponding shape of openings to be ablated in the workpiece by the coherent light transmitted through the mask;

the transparent optical features having a density at the regions complimentary in shape to a corresponding shade of the openings to be ablated to deflect varying amounts of light through the imaging objective to produce variable ablation at the workpiece responsive to the coherent light passing through the mask.

2. A mask for ablation of a workpiece by coherent light according to claim 1 and wherein:

the mask includes first and second regions;

the first region has a first density of the transparent optical features for ablating the workpiece with a profile of the first region to a first depth; and, the second region has a second and different density of the transparent optical features for ablating the workpiece with a profile of the second region to a second depth.

3. A mask for ablation of a workpiece by coherent light according to claim 2 and wherein:

the density of the transparent optical features across the first and second regions is constant.

4. A mask for ablation of a workpiece by coherent light according to claim 2 and wherein:

the density of the transparent optical features across the first and second regions is variable.

5. A mask for ablation of a workpiece by coherent light according to claim 1 and wherein:

the transparent optical features include tapered gratings.

6. A mask for ablation of a workpiece by coherent light according to claim 5 and wherein:

the tapered gratings having a constant taper.

7. A mask for ablation of a workpiece by coherent light according to claim 5 and wherein:

the tapered gratings having a step taper.

8. A mask for ablation of a workpiece by coherent light according to claim 1 and wherein:

the optical features have constant size and are placed in varying density to form the image.

9. A mask for ablation of a workpiece by coherent light according to claim 1 and wherein:

the optical features have gratings and optical features of constant size in variable density.

10. A method for encoding variable transmission of an image in a transparent substrate, the method comprising:

determining the image;

determining a desired transmission profile of the image;

providing a transparent substrate;

creating transparent optical features in the transparent substrate corresponding to the image in the substrate;

varying the density of the transparent optical features consisting of pi phase shifting regions in gratings, the gratings having groove widths varying according to a formula $$w=GP*(1-A)/2$$

where w is the local groove width, A the desired wave amplitude (square root of the transmission) and GP is the grating or groove period of the grating pattern.

11. A transparent mask for ablation utilizing coherent light by image projection, the mask comprising:

a transparent substrate;

first transparent optical features on the mask including gratings tapering to a minimum width, second transparent optical features on the mask adjacent the first transparent optical feature including features having a length and width exceeding the minimum width for producing a phase shifts in the coherent light;

the first and second transparent optical features forming an image for projection by the coherent light;

the first and second transparent optical features combining to provide transmitted amplitude variation of the coherent light passing through the transparent substrate.

12. The product of the process of claim 11.

13. A method for encoding variable coherent light transmission in a transparent mask, the method comprising:

providing a transparent substrate;

determining an image to be transmitted;

determining the desired wave amplitude of all points of the image to be transmitted;

creating transparent randomly positioned pi phase shifting regions on the plate;

varying the frequency of occurrence of the randomly positioned pi phase shifting regions at corresponding points on the plate to corresponding points on the image for achieving the desired wave amplitude of the image according to the formula $$P=(1-A)/2$$

where P is the probability that a given pixel is given a $\pi$ phase shift and A the desired wave amplitude of the image.

14. The product of the process of claim 13.

15. Method for encoding variable transmission image in a transparent reticle, the method comprising:

providing a transparent substrate;

determining an image to be transmitted;

determining the desired transmission profile of all points on the image to be transmitted;

determining the minimum manufacturable feature size FS* (always< GP/2);

creating a plate consisting of pi phase shifting regions in the form of gratings having a grating period greater than twice the minimum manufacturable feature size;

varying the groove width of the gratings according to the formula $$w= GP*(1-A)/2$$

where w is the local groove width, A the desired wave amplitude (square root of the transmission) and GP is the grating or groove period of the grating pattern;

randomly interrupting the groove pattern whenever the groove width w computed according the preceding formula is less than the manufacturable feature size, FS*, with a probability P computed according to $$P=\tfrac{1}{2}*GP*(1-A)/FS*$$

where P is the probability that a given FS* sized pixel is given a $\pi$ phase shift relative to an adjacent grating, A the desired wave amplitude, and GP the grating or groove period.

16. The product of the process of claim 15.

17. The product of the process of claim 10.

* * * * *